(12) United States Patent  
Ebrahimi Afrouzi

(10) Patent No.: US 12,416,917 B1  
(45) Date of Patent: Sep. 16, 2025

(54) AUTONOMOUS SHOPPING DEVICE

(71) Applicant: Ali Ebrahimi Afrouzi, Henderson, NV (US)

(72) Inventor: Ali Ebrahimi Afrouzi, Henderson, NV (US)

(73) Assignee: AI Incorporated, Toronto (CA)

( * ) Notice: Subject to any disclaimer, the term of this patent is extended or adjusted under 35 U.S.C. 154(b) by 62 days.

(21) Appl. No.: 17/744,652

(22) Filed: May 14, 2022

Related U.S. Application Data

(63) Continuation of application No. 16/171,890, filed on Oct. 26, 2018, now abandoned.

(60) Provisional application No. 62/578,228, filed on Oct. 27, 2017.

(51) Int. Cl.
| | | |
|---|---|---|
| G05D 1/00 | (2024.01) | |
| G06Q 10/0832 | (2023.01) | |
| G07F 9/00 | (2006.01) | |
| G07F 11/46 | (2006.01) | |

(52) U.S. Cl.  
CPC .......... *G05D 1/0088* (2013.01); *G05D 1/0225* (2013.01); *G06Q 10/0832* (2013.01); *G07F 9/002* (2020.05); *G07F 11/46* (2013.01)

(58) Field of Classification Search  
CPC ............... G05D 1/0088; G05D 1/0225; G05D 2201/0216; G06Q 10/0832; G07F 9/002; G07F 11/46  
See application file for complete search history.

(56) References Cited

U.S. PATENT DOCUMENTS

| | | | | |
|---|---|---|---|---|
| 5,206,814 A | * | 4/1993 | Cahlander | G07F 17/0042 360/92.1 |
| 6,138,063 A | * | 10/2000 | Himeda | G05D 1/0223 29/273 |
| 6,338,013 B1 | * | 1/2002 | Ruffner | B60L 3/106 180/443 |
| 6,584,375 B2 | * | 6/2003 | Bancroft | G07F 9/001 235/383 |
| 8,509,947 B2 | * | 8/2013 | Jarisch | B25J 11/00 221/96 |
| 9,250,003 B2 | * | 2/2016 | Kim | F25D 29/003 |
| 9,639,960 B1 | * | 5/2017 | Loveland | G06V 20/176 |
| 10,435,279 B2 | * | 10/2019 | Taylor | G06T 7/593 |
| 10,453,146 B1 | * | 10/2019 | Stricker | G06Q 40/08 |
| 10,558,224 B1 | * | 2/2020 | Lin | G05D 1/0285 |
| 11,099,562 B1 | * | 8/2021 | Ebrahimi Afrouzi | G05D 1/0225 |
| 2002/0156556 A1 | * | 10/2002 | Ruffner | G05D 1/0282 342/357.66 |
| 2004/0210346 A1 | * | 10/2004 | Lee | G05D 1/0255 318/568.12 |
| 2004/0249497 A1 | * | 12/2004 | Saigh | E04H 14/00 700/216 |
| 2005/0010330 A1 | * | 1/2005 | Abramson | G05D 1/0225 318/568.12 |
| 2007/0135933 A1 | * | 6/2007 | Panesse | B25J 9/1671 700/17 |

(Continued)

*Primary Examiner* — Sihar A Karwan

(57) ABSTRACT

Provided is an autonomous mobile robotic device that may carry, transport, purchase and deliver one or more items for purchase in a work environment. The robotic device may include a container within which the one or more items may be placed. Once tasks are complete, the robotic device may autonomously navigate to a predetermined location.

17 Claims, 4 Drawing Sheets

(56) References Cited

U.S. PATENT DOCUMENTS

| | | | | |
|---|---|---|---|---|
| 2008/0004751 A1* | 1/2008 | Chung | ............... | G05D 1/028 |
| | | | | 901/1 |
| 2012/0143428 A1* | 6/2012 | Kim | ............... | A47L 9/2831 |
| | | | | 701/23 |
| 2013/0297066 A1* | 11/2013 | Alvern | ............... | G07F 9/002 |
| | | | | 700/232 |
| 2014/0094964 A1* | 4/2014 | Bartholomew | ...... | A45D 44/005 |
| | | | | 700/233 |
| 2014/0120235 A1* | 5/2014 | Jones | ............... | G07F 17/0064 |
| | | | | 901/30 |
| 2016/0171303 A1* | 6/2016 | Moore | ............... | B25J 5/00 |
| | | | | 901/1 |
| 2016/0260054 A1* | 9/2016 | High | ............... | H04L 67/141 |
| 2017/0010618 A1* | 1/2017 | Shashua | ............... | G05D 1/0246 |
| 2017/0248964 A1* | 8/2017 | Kentley | ............... | G01S 7/4972 |
| 2017/0297201 A1* | 10/2017 | Shionozaki | ............... | F24F 11/89 |

* cited by examiner

AUTONOMOUS SHOPPING DEVICE

CROSS-REFERENCE TO RELATED APPLICATIONS

This application is a Continuation of U.S. Non-Provisional patent application Ser. No. 16/171,890, filed Oct. 26, 2018, which claims the benefit of Provisional Patent Application No. 62/578,228 which is hereby incorporated by reference. In this application, certain U.S. patents, U.S. patent applications, or other materials (e.g., articles) have been incorporated by reference. Specifically, in addition to the preceding, U.S. patents application Ser. Nos. 15/272,752, 62/631,050, 62/661,802, 16/051,328, and 15/951,096 are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

The present disclosure relates to robotic devices, and more specifically to robotic devices that assist with shopping at establishments.

BACKGROUND

Autonomous or semi-autonomous robotic devices provide assistance to individuals by eliminating various tasks from an individual's workload. For example, robotic devices have been introduced that provide cleaning tasks so that an individual does not have to do so. Currently, when shopping in physical locations such as, for example, retail establishments, grocery stores, malls and the like, an individual must handle the shopping experience themselves physically. For example, if an individual is shopping at a clothing store and wishes to buy a shirt, the individual must pick up the shirt and carry it or place it in a shopping cart and push the cart. As another example, if an individual is shopping at a grocery store and wishes to purchase a bag of apples, the individual may have to pick up the bag of apples, and either carry it or place it in a shopping cart and physically push the shopping cart through the store, and either carry the items to, for example their vehicle, or push the shopping cart containing the items therein to a vehicle. Robotic devices offer a useful solution for eliminating these tasks from an individual's physical demands.

None of the preceding discussion should be taken as a disclaimer of any of the described techniques, as the present approach may be used in combination with these other techniques in some embodiments.

SUMMARY

The following presents a simplified summary of some embodiments of the present techniques. This summary is not an extensive overview of the invention. It is not intended to limit the invention to embodiments having any described elements or to delineate the scope of the invention. Its sole purpose is to present some embodiments of the invention in a simplified form as a prelude to the more detailed description that is presented below.

Some aspects include a robotic device for delivering items, including: one or more processors; a chassis; a set of wheels coupled to the chassis; a motor for driving the set of wheels; a rechargeable battery for providing power to the robotic device; a set of sensors; and a container within which one or more items are carried for delivery to a purchaser; wherein: the purchaser comprises a human using the robotic device for delivery services of the one or more items; and the one or more items are separate and independent items from the robotic device and components of the robotic device.

BRIEF DESCRIPTION OF DRAWINGS

The present techniques are described with reference to the following figures.

DETAILED DESCRIPTION OF SOME EMBODIMENTS

Figure 1:
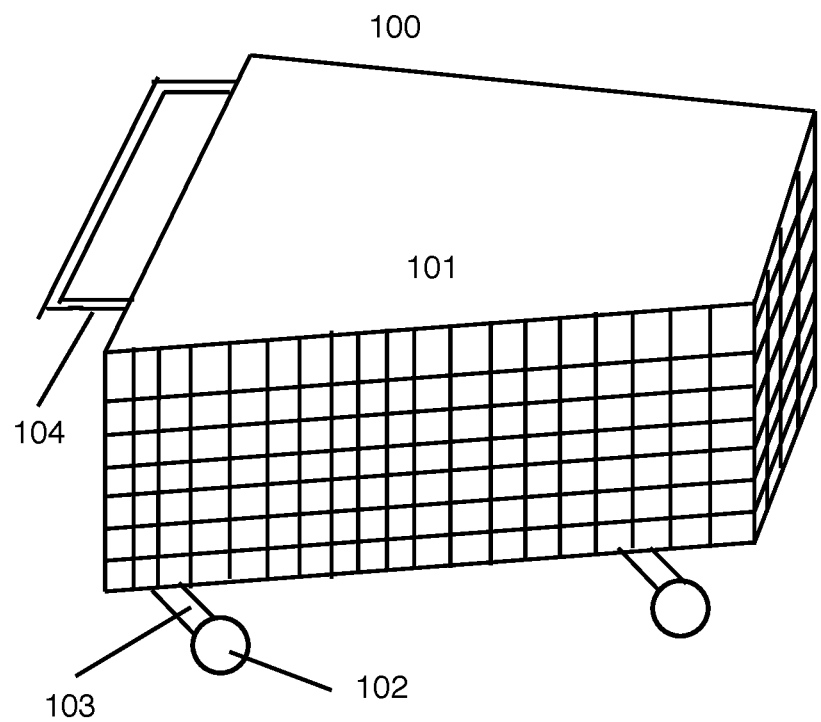
FIG. 1 is a schematic diagram of an example of a robotic device with which the present techniques may be implemented in some embodiments.

The present inventions will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present inventions, or subsets thereof, may be practiced without some or all of these specific details. In other instances, well known process steps and/or structures have not been described in detail in order to not unnecessarily obscure the present inventions. Further, it should be emphasized that several inventive techniques are described, and embodiments are not limited to systems implementing all of those techniques, as various cost and engineering trade-offs may warrant systems that only afford a subset of the benefits described herein or that will be apparent to one of ordinary skill in the art.

Various embodiments are described herein below, including methods and systems. It should be kept in mind that the invention might also cover articles of manufacture that include a computer-readable medium on which computer-readable instructions for carrying out various embodiments of the inventive techniques are stored. The computer-readable medium may include semi-conductor, magnetic, opto-magnetic, optical, or other forms of computer-readable medium for storing computer-readable code. Further, embodiments may also include apparatuses for practicing embodiments of the invention. Such apparatus may include circuits, dedicated and/or programmable, to carry out tasks pertaining to embodiments described herein.

In some embodiments, "robot" or "robotic device" may include one or more autonomous or semi-autonomous devices having communication, an actuator, mobility, and/or processing elements. Such robots or robotic devices may, but are not required to (which is not to suggest that any other described feature is required in all embodiments), include a casing or shell, a chassis, a transport drive system such as wheels or other mobility device, a motor to drive the wheels or other mobility device, a receiver that acquires signals transmitted from, for example, a transmitting beacon, a processor and/or controller that processes and/or controls motors, methods, and operations, network or wireless communications, power management, etc., and one or more clock or synchronizing devices. Robots or robotic devices may also include a power module for delivering (and in some cases storing) electrical power, a sensor module for observing the environment and for sending commands based on the observed environment, and a control module for storage of operation modes, command responses to the observed environment or user input, and the like. The sensor module may include sensors for detecting obstacles, types of flooring, cliffs, system status, temperature, and the like or sensors for measuring movement. An interface module may also be included to provide an interface between the robot and the user. The robot or robotic device may further include IR sensors, tactile sensors, sonar sensors, gyroscopes, ultrasonic range finder sensors, depth sensing cameras, odometer sensors, optical flow sensors, LIDAR, cameras, IR illuminator, remote controls, Wi-Fi capability, network card, Bluetooth capability, cellular functionality, USB ports and RF transmitter/receiver. Other types of robots or robotic devices with other configurations may also be used.

As understood herein, the term "purchaser", "purchasers", "user", "users", "individual" or "individuals" may be defined generally to include any entity that utilizes the mobile robotic device including humans, other robotic devices, control systems, other devices, and the like.

As understood herein, the term "work cycle", "work session", "operational session" or "operational cycle" may be defined generally as a work time of a robotic device from start to finish, whether ended by completion of work of an area, by instruction or programmed setting, or by the depletion of a battery powering the robotic device.

In embodiments, a control system of the robotic device may be utilized. The control system may include, but is not limited to, a system or device(s) that perform, for example, methods for receiving and storing data; methods for processing data; methods for processing command responses to stored or processed data, to the observed environment, to internal observation, or to user input; methods for detecting operational hazards in the work environment; and methods for navigation and other operation modes. For example, the control system may receive data from an obstacle sensor, and based on the data received, the control system may respond by commanding the robotic device to move in a specific direction. As a further example, the control system may receive image data of the observed environment, process the data, and use it to create a map of the environment. The control system may be a part of the robotic device, the camera, a navigation system, a mapping module or any other device or module. The control system may also comprise a separate component coupled to the robotic device, the navigation system, the mapping module, the camera, or other devices working in conjunction with the robotic device. More than one control system may be used.

As understood herein, the terms "work environment", "store", "establishment" or "location" may be defined generally to include a work location in which a robotic device is operating including but not limited to, grocery stores, retail establishments, malls, convenience stores, parking lots and the like.

As understood herein, the term "work area" may be defined generally to mean the general area in which a robotic device is operating in.

Embodiments of the invention propose an autonomous mobile robotic device that may carry and transport items within an environment. The robotic device may comprise but is not limited to, a set of wheels, a power source, a chassis, a suspension system, a rechargeable battery, a communications module, one or more control modules and a processor. In embodiments, the robotic device may further comprise a container in which items may be placed and carried. In some embodiments, the robotic device may further comprise a user interface for, for example, adjusting settings, choosing functions, scheduling tasks, etc., a mapping module for mapping the environment using mapping techniques such as SLAM, and mapping tools such as imaging devices, sonar devices, LIDAR and LADAR devices, structured light devices, stereo vision and the like. In some embodiments, the robotic device may further comprise a localization module. Cameras, LIDAR, LADAR, stereo imaging, signal detectors and receivers, gyroscope, optical encoder, optical flow sensor, TOF sensors, depth sensors and other devices may be used to capture information that the processor of the robotic device may use to localize itself within an internal map of the working environment. In some embodiments, the processor of the robotic device may use machine learning techniques to learn the most optimal route for transporting an item from a first location to a second location and so forth. Various observations may be collected during operation in order to determine the most optimal path for the robotic device when transporting the item(s). For example, observations such as number of collisions, travel time, number of stalls, and travel distance may be used in determining the most optimal path. In some embodiments, the robotic device may have a wireless module to wirelessly send and receive information, such as a Wi-Fi module, a Bluetooth module, a RF module and the like. In some embodiments, the robotic device may comprise a scheduling module for, for example, setting a schedule for transportation of items. This may include the day, time, frequency, transportation time to a specific location, and the like. In embodiments, the robotic device may have voice-activated capabilities. In some embodiments, the robotic device may comprise a payment module, in which the robotic device is capable of carrying out payment transactions. In embodiments, the suspension system of the robotic device may comprise a dual suspension system. An example of a suspension system may be found in U.S. patent application Ser. No. 15/951,096, hereby incorporated by reference in its entirety. In particular column 1 lines 30-68 and column 2 lines 1-49.

In embodiments, the robotic device may carry and transport items at establishments with the purpose of a carrying, transporting, and delivering items for purchase for a purchaser. For example, in grocery stores, the robotic device may carry grocery items such as produce, while in retail establishments, the robotic device may carry and transport items for sale such as clothing, household goods, etc., In some embodiments, the robotic device may be able to carry and transport a variety of different types of items. For example, a robotic device may have the ability to carry and transport retail items such as, for example, clothing while also transporting food items such as produce. In embodiments the robotic device may be able to complete transactions for the items carried and transported for the purchaser. In some embodiments, the robotic device may be stored in at least one specific location until the robotic device is provided with instructions for a work session. For example, the robotic device may be stored at a docking station until instructions are received to perform work functions. In embodiments, a robotic device may comprise solar panels for recharging a battery of the robotic device. In embodiments, a battery of a robotic device may be charged at a docking station. In embodiments, the robotic device may be stored in at least one specific location until the robotic device is provided with instructions to perform work functions, transporting items to one or more particular locations and/or executing a scheduled command. For example, the robotic device may be stored in a specific location, until commands are received to retrieve produce from a specific location and to transport the produce to a second location at a specific time. In another example, a robotic device may be stored at a specific location after which it is requested by a purchaser and will follow that purchaser around the establishment as the purchaser does their shopping. In some embodiments, the robotic device may comprise a container in which items are placed therein. In some embodiments, the robotic device may comprise a platform, in which items are placed thereon. In some embodiments, the item(s) placed on or within the robotic device may be placed as such by, for example, a mechanism of the robotic device, an individual, a purchaser, another robotic device, another machine, another device, or the like. In some embodiments, the item(s) placed on or within the robotic device may be collected from at least one predetermined location. In some embodiments, the item(s) placed on or within the robotic device may be collected at at least one predetermined date and time. In some embodiments, the item(s) placed on or within the robotic device may be collected on a recurring basis such as, for example, a weekly or bi-weekly basis. In some embodiments, items may be transported at specific times to one or more locations. For example, produce may be picked up from a produce aisle and delivered to more than one individual. In some embodiments, after distributing or delivering an item or completing a work task, the robotic device may autonomously navigate back to a designated storage location. In some embodiments, the robotic device may comprise a module for regulating the temperature within a container of the robotic device. In some embodiments, the robotic device may comprise a module for regulating the temperature of items carried by the robotic device. In some embodiments, the robotic device may comprise a refrigeration module in which items are kept at a particular temperature. In some embodiments, the robotic device may comprise a freezing module at which items are kept at a particular temperature. In some embodiments, a robotic device may comprise a warming or heating module for warming or heating items carried and transported by the robotic device. In some embodiments, the robotic device may comprise a cooking module such as a microwave or oven in which an item may be cooked. In embodiments, for example, an item may be purchased and the item is heated to a particular temperature before being delivered to the purchaser. In some embodiments, a robotic device may comprise a module for the packaging of items that have been purchased from an establishment. For example, a robotic device may utilize a module that packages items purchased in a box, a bag, and the like.

In some embodiments, scheduling information for the pickup, transportation, purchase and/or delivery of items may be provided to one or more processors of the robotic device. In some embodiments, scheduling information may be sent to a robotic device using a mobile communication device with a graphical user interface, remote control, a user interface on the robotic device, or another type of device that may communicate with the one or more processors of the robotic device. For example, a graphical user interface such as that described in U.S. patents application Ser. Nos. 15/272,752, 62/631,050, and 62/661,802, hereby incorporated by reference in their entirety, may be used for entering scheduling information. In some embodiments, a method for providing scheduling information to a robotic device such as that described in U.S. patent application Ser. No. 16/051,328, hereby incorporated by reference in its entirety, may be used. In particular column 2 line 34-65 and column 3 lines 1-32. In some embodiments a web application, mobile application or software may be used for scheduling and sending scheduling information to the one or more processors of the robotic device. In some embodiments, scheduling information may be sent to the one or more processors of the robotic device using Wi-Fi, Bluetooth, RF, or other types of wireless connections. In some embodiments, auditory instructions may be provided to the robotic device by, for example, a purchaser, specialized computer, robotic device, or control system. For example, a purchaser may audibly command the robotic device to purchase and transport a particular item such as clothing, home goods, groceries or the like. In some embodiments, the robotic device may comprise a microphone module to receive voice commands. In embodiments, a purchaser may command the robotic device to complete a transaction for an item, setting a schedule for the time of purchase and time and location of delivery of the item. For example, utilizing an application of a communications device, a purchaser may select that an item for purchase be purchased at a particular time, and delivered at a particular time to the purchaser's vehicle in the parking lot of the establishment the item was purchased from. In some embodiments, a graphical user interface of a communications device, or a screen with graphical user interface of a robotic device may display item information regarding an item for purchase. The description of the item may describe any of but not limited to: price information, size information, item weight, type of item, place of manufacture, date of manufacture, date of expiration, sell by date, nutritional data, item composition data, location of origin, and the like. In some embodiments, a purchaser may be able to interact with a graphical user interface of a communications device or a screen with graphical user interface of a robotic device for making item selections such as to purchase an item and the like. In some embodiments, a robotic device may display a recipe for a dish and the items necessary for the recipe on a screen with graphical user interface of the robotic device or a graphical user interface of a communications device. In some embodiments, advertising may be displayed on a screen with graphical user interface of a robotic device or a communications device. In some embodiments, a screen of a robotic device may be a touchscreen. In some embodiments, a purchaser may place an order for items to be purchased using a remote control for a robotic device, application of a communications device paired with a robotic device, on a screen with graphical user interface of a robotic device, audibly via voice commands with a microphone module of a robotic device, or the like. In some embodiments, a screen with graphical user interface or application of a mobile communications device may display the location of items for purchase in the work environment in order to aid a purchaser with locating items for purchase.

In some embodiments, delivery of the items purchased may be set to the purchaser's location, or a location at which the purchaser will arrive, such as the purchaser's vehicle in a parking lot. In embodiments, a robotic device may identify the location of a purchaser or purchaser's vehicle, using for example, coordinates in a GPS coordinate system, which may be communicated to one or more processors of the robotic device via an application of a communications device such as, for example, a smartphone, tablet, laptop, computer, or the like, and the robotic device will navigate to this location for delivery of the purchased items. In some embodiments, a robotic device may contain a prerendered map of the work environment and the location of the purchaser may be marked in the map, such as, by a communication from an application of a communications device of the purchaser. In some embodiments, delivery of items for purchase may be for a specific location of all items purchased, with the purchaser traveling to this location for retrieval of the items for purchase. For example, delivery of items may be at a pre-designated location such as in front of the establishment that the items were purchased from and all purchasers must obtain their items purchased from this location, where the robotic device will deliver the purchased items to the purchaser. In embodiments, a robotic device may navigate to the location of the purchaser, and the robotic device may generate a map of the work environment as the robotic device traverses through the work environment. In embodiments, the time at which the robotic device navigates to a location for delivery of an item may vary. In embodiments, for example, a robotic device may navigate to and deliver an item to a purchaser as soon as a purchaser arrives at a location. As an example, an application of a communications device may communicate with one or more processors of a robotic device in order to alert in real time that any of: a purchaser is on their way, a purchaser has reached within a predetermined threshold of a distance from the robotic device, a purchaser has arrived at a location, and the robotic device may thereafter navigate to deliver the purchased items to the purchaser. In some embodiments, a robotic device may deliver items purchased to the purchaser at the same time that a purchaser arrives for delivery of the items, the robotic device navigating to a location ahead of time or arriving at the location simultaneously with the purchaser. In some embodiments, a robotic device may navigate to a location after a purchaser arrives for delivery of items, the robotic device navigating to the location of the purchaser. In some embodiments a robotic device may monitor in real time the location of the purchaser of items via an application of a communications device. In embodiments if an unexpected delay occurs on the part of the purchaser, one or more processors of the robotic device may elect to choose a behavioral response on the part of the robotic device. As an example, if a purchaser encounters heavy traffic thereby delaying the purchaser for a lengthy period of time, one or more processors of a robotic device may determine that there is a risk of, for example, food spoilage of the items in the compartment of the robotic device, and therefore may return the items to their storage locations for purchase by another purchaser, to a storage location, whereby the items may be reobtained by the robotic device to deliver the items to the purchaser once they arrive or where once the purchaser arrives the purchaser may obtain the items themselves, or the like. In embodiments, if items for purchase are returned to storage by the robotic device due to an unexpected delay on the part of the purchaser, the items may be reobtained, or new items may be obtained once the purchaser arrives within a predetermined threshold of a distance from the robotic device or establishment the items were purchased from.

In some embodiments, a robotic device may comprise a code scanning module, such as a barcode scanner, QR code scanner or the like. In embodiments, utilizing an application of a mobile communications device such as a smartphone, tablet, or the like, a barcode, QR code, or the like may be generated, the code representing a purchaser profile specific to the purchaser, and the code scanning module of the robotic device may scan the code to retrieve data specific to the purchaser. In embodiments, when a code scanner of a robotic device obtains data specific to the purchaser, the data may be representative of shopping lists, prior purchasing history, location of purchaser's vehicle, purchaser's payment methods including payment data, purchaser's shopping trends, purchaser's demographic data, purchaser contact information, purchaser's address, and the like. In embodiments, a code scanner of a robotic device may be utilized for scanning a code located on a product, in order to identify that the product in question has been obtained. In some embodiments, a code scanner of a robotic device may be utilized for scanning a product of a code to display a price of a product, the price displayed on, for example, a screen with graphical user interface of a robotic device, a graphical user interface of an application of a communications device, via an audible message made by the robotic device or application of a mobile communications device, or the like.

In embodiments, the processor of the robotic device may learn a path, such as a path between a first location and a second location, in a variety of ways. In some embodiments, the robotic device may be taught a path by directing the robotic device along the desired path by physically moving the robotic device or by using a remote control or an application of a communication device paired with the robotic device. Other methods of moving the robotic device along the desired path may also be used. For example, the robotic device may be taught a path between a first location by physically wheeling the robotic device from the first location, through the environment, to a second location. In some embodiments path learning may be initiated by, for example, a user pressing a start button on the robotic device or on any other device capable of communicating with the robotic device, voice activation or autonomously upon startup. In some embodiments, path learning may be completed by, for example, pressing an end button on the robotic device or on any other device capable of communicating with the robotic device, voice activation, or autonomously upon detecting no movement of the robotic device. Path learning may be initiated when the robotic device is positioned at the first location of the robotic device and completed after the robotic device has navigated along the desired path to the second location. In embodiments, there may be multiple locations along the path between the first and second location in which the robotic device may stop. In some embodiments, wherein the path of the robotic device comprises driving one way along a path and returning back in the same way along the same path, path learning may be initiated when the robotic device is positioned at the first location and completed after the robotic device has navigated to the location in which the robotic device is to turn around and return back along the same path to the first location. Alternatively, in some embodiments, path learning may be initiated and completed using an application of a communication device, such as a mobile device, laptop or smart phone, capable of communicating with the robotic device. In some embodiments, an application of a communication device may be used to mark a path of the robotic device within a map of the environment that may be shared with the robotic device. During path learning, the processor of the robotic device may determine its location within an internal map of the environment while simultaneously mapping the environment. In some instances, the processor of the robotic device may mark observed obstacles or features in the working environment within an internal map of the environment.

In some embodiments, a memory of the robotic device may contain an internal database of obstacles likely to be encountered within the working environment. In embodiments, an obstacle encountered in the work environment may be identified using various sensors to capture features of the obstacle and the processor to determine the type of obstacle based on the internal database. The processor of the robotic device may note the increased likelihood of that type of obstacle being located in the region of the environment in which it was encountered. For example, if a robotic device encounters an article of clothing on the ground, image sensors of the robotic device may capture features of the article of clothing and the processor may determine it is an article of clothing based on an internal database of obstacles and their features. The processor of the robotic device may mark the region in which the obstacle was encountered within an internal map as a region with increased likelihood of containing such an obstacle. In some embodiments, the processor may further determine if an obstacle may be overcome by the robotic device such as by, for example, providing for the robotic device to attempt to overcome the obstacle by driving over it. If, however, the robotic device encounters a large obstacle of which the robotic device may not overcome, such as a for example, a display of items for sale, the processor may determine that it cannot overcome the obstacle and may attempt to maneuver around the obstacle. In embodiments, if a robotic device is unable to overcome an obstacle of which it has attempted to overcome, one or more processors of the robotic device may catalogue the encounter for future use. In some embodiments, regions wherein obstacles are consistently encountered may be classified by the processor of the robotic device as an area with a high likelihood of containing obstacles and may be marked in an internal map of the robotic device with regards to the work environment as such. In some embodiments, one or more processors of the robotic device may attempt to alter the robotic device's path in order to avoid high obstacle areas.

In embodiments, one or more processors of the robotic device may generate multiple maps of the working environment over multiple working sessions. The maps may be stored in a memory of the robotic device and may be combined with previously generated maps using the one or more processors of the robotic device to keep the map of the working environment up to date. In some embodiments, a prerendered map of the working environment may be generated and stored in an internal memory of the robotic device. In some embodiments, the robotic device may generate a map of the environment during operation in the environment. In embodiments, the one or more processors of the robotic device may update the internal map of the environment with the observations collected during each successive work session. Continuous updates to the map of the environment may help establish the most efficient path of the robotic device.

In some embodiments, the robotic device may alert the user when an unanticipated obstacle blocking the path of the robotic device is encountered, particularly when the robotic device may not overcome the obstacle by maneuvering around or driving over the obstacle. The robotic device may alert the user by generating a noise, sending a message to an application of a communication device paired with the robotic device or any other device paired with the robotic device, displaying a message on a screen with graphical user interface of the robotic device, illuminating lights, and the like.

In some embodiments, one or more commands may be provided to one or more processors of the robotic device by, for example, a user, another robotic device, a control system, a specialized computer, etc. In embodiments, the command may be provided to the processor using verbal commands, a mobile application and/or web application and/or software, a communication device with a graphical user interface paired with the robotic device, and/or a screen with graphical user interface on the robotic device. For example, a purchaser may verbally command the robotic device to purchase, carry and transport purchased items such that the purchaser does not need to physically purchase, carry, or transport the purchased items. In embodiments, a purchaser may navigate around an establishment, giving verbal commands to a robotic device, the robotic device following the purchaser around the establishment as the purchaser navigates around the establishment. In some embodiments, an application of a mobile communications device may be utilized in which a purchaser gives commands to a robotic device. In some embodiments, a communication device or an application of a communication device may be used to command the robotic device to remain within a predetermined range of the communications device. In embodiments, commands may be given through an application of a mobile communications device to a robotic device such that the purchaser does not need to physically purchase, carry, or transport the purchased items. In embodiments, for example, a purchaser, using an application of a communications device, may purchase items ahead of time, prior to arriving for pickup of the purchased items, and the items may be delivered to the purchaser once the purchaser arrives for pickup of the items. In embodiments, a purchaser may navigate around an establishment, the purchaser giving commands to the robotic device through an application of a communications device as the purchaser navigates through the establishment, and the robotic device following the purchaser as the purchaser navigates the establishment. In some embodiments, a purchaser may be able to remotely control the movements and actions of a robotic device utilizing, for example, an application of a communications device, a remote control, or the like. For example, a robotic device may contain a camera providing a live camera feed to a purchaser, and the purchaser may access the live feed and remotely control the robotic device utilizing, for example, an application of a communications device, navigating the robotic device through the work environment and making item selections remotely. In some embodiments, a purchaser may place items for purchase into the robotic device themselves. In other embodiments, the robotic device may contain a module for obtaining the items for purchase without requiring the purchaser's physical intervention. In some embodiments, a voice command may be given such that the robotic device remains within a predetermined range of an individual. In other embodiments, a mobile application of a communication device, such as a smartphone, paired with the robotic device may autonomously initiate the robotic device to execute a command when the communication device is within a predetermined range of the robotic device. In other embodiments, information gathered by the robotic device may be used to initiate a particular action of the robotic device. For example, upon sensing that an individual who has pre-purchased items has arrived at a retail establishment, the robotic device may transport the purchased items to the location of the individual. As a further example, upon detecting that an individual has entered an establishment, a robotic device may approach and follow that individual as the individual traverses the establishment. In some embodiments, the robotic device may autonomously follow an individual around a work environment navigating through the work environment autonomously without physical intervention on the part of the individual. In embodiments, the items for purchase may be physically placed in the robotic device by the individual. In some embodiments, the items for purchase may be obtained by the robotic device autonomously. In some embodiments, a vending mechanism may be utilized in which a physical storage area in a work environment contains items for purchase and the individual selects the item they wish to purchase, after which the robotic device arrives and receives the item for purchase from the physical storage area via a vending mechanism. For example, an individual at a grocery store may select that they wish a particular number of onions, the robotic device may arrive to obtain the onions from the location by linking up via a vending mechanism with the storage location of the onions.

In some embodiments, commands and/or instructions for one or more robotic devices may be set within a control system of the one or more robotic devices. In some embodiments, preferences or instructions corresponding to a particular individual may be set within the control system. In embodiments, the control system may instruct a robotic device to execute a particular task when a particular individual becomes present within an environment. For example, upon a particular purchaser entering a work environment, the control system may instruct a robotic device to the location and proximity of the purchaser such that the robotic device remains within a predetermined distance from the purchaser even as the purchaser traverses the work environment. In some embodiments, the control system may detect an individual using sensors, cameras, or the like, or may be made aware that an individual has entered an area of the environment by a signal sent from a communication device paired with the control system, the robotic device, or other control system. A communication device may comprise a mobile device, tablet, laptop, remote control, etc.

In embodiments, preferences may be set for operations or navigation of a robotic device. For example, utilizing a user interface of a communication device paired with the robotic device, such as a mobile device, laptop, tablet, smartphone, or the like, preferences may be set for the robotic device. In embodiments, for example, utilizing an application of a communication device path learning may be initiated and completed, path planning may be set, operational functions may be selected, scheduling information may be selected, and the like. In embodiments, for example, preferences may be selected for a robotic device with regards to for example, how a purchaser selects items for purchase, what rate of navigational speed a robotic device is to navigate at, where a robotic device is to deliver items to, what type of items a purchaser tends to purchase, the date and time a purchaser makes purchases, what temperature a purchaser enjoys items purchased at, how a purchaser enjoys items to be delivered such as for example whether a purchaser enjoys items to be delivered in a box, bag, or the like, whether a recurring schedule should be set for purchases, what navigational path should be taken, the priority for navigation or operational functions, in what order a robotic device should obtain items, and the like.

In some embodiments, the robotic device may comprise a container in which items are transported. For example, a container of a robotic device may be similar to that of a shopping cart. FIG. 1 illustrates an example of a design of a robotic device. In FIG. 1 robotic device 100 comprises a cart with a handle 104 set of wheels 102, suspension system 103, and container 101. Items for purchase may be placed in container 101 of robotic device 100. Wheels 102 of robotic device may be mecanum wheels utilized for multidirectional ability. Robotic device 100 will utilize suspension system 103 for the purpose of traversing through various terrain in the work environment. Handle 104 of robotic device 100 may be utilized for manual pushing of the robotic device 100. In some embodiments, a container of a robotic device may comprise a closed container. In some embodiments, the robotic device may include various modules for keeping items at various temperatures. For example, a robotic device may utilize a freezing module and/or a refrigeration module for the purpose of keeping items such as food items at particular temperatures. In some embodiments, items selected for purchase may be obtained by the robotic device in order of the type of item purchased, such as, for example, whether an item is required to be frozen, refrigerated, or neither. For example, in a grocery store goods not requiring a cooling element may be obtained first, followed by goods requiring refrigeration, followed by goods requiring freezing elements. Such an example of the order in which goods are obtained by the robotic device may aid in avoiding food spoilage. In embodiments, cooking modules such as microwaving or oven modules may be utilized for cooking items purchased by an individual. For example, an individual may pre-purchase an item using, for example an application of a communications device and request that the item be cooked or set at a particular temperature by the time the individual arrives at the establishment. The robotic device may obtain the item which will be placed in the cooking module, whereby the item is heated, and the robotic device will transport the item to the individual once the individual arrives at the establishment. As an example, say an individual has ordered a frozen entree, the frozen entree may be cooked in the cooking module and delivered hot to the individual once the individual arrives at the establishment. In some embodiments, a robotic device may comprise of a warming module. In some embodiments a single robotic device may be utilized for multiple different transactions such that a compartment of a robotic device may contain goods for a first transaction while a second compartment may be utilized for a second transaction. In embodiments, compartments may be locked until the individual authorized for pickup of the items has arrived or has been verified.

Figure 2:
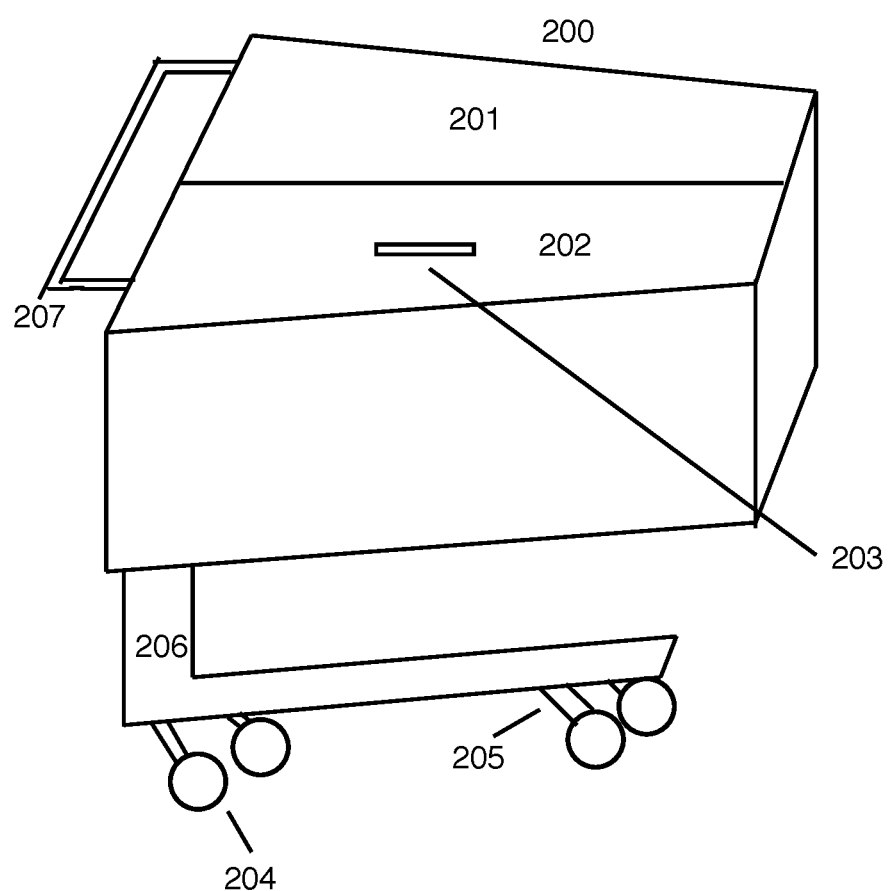
FIG. 2 is a schematic diagram of an example of a robotic device with which the present techniques may be implemented in some embodiments.

In FIG. 2 an example of a robotic device is illustrated. FIG. 2 displays robotic device 200, robotic device 200 further comprising a dry good storage area 201, a temperature controlled storage area 202 and an underside bulk storage area 206. Temperature controlled storage area 202 of robotic device 200 further utilizes a container lid 203 for the purpose of enclosing and controlling the temperature of temperature controlled storage area 202. Robotic device 200 further utilizes a set of wheels 204, such as mecanum wheels which may be utilized for multidirectional purpose, a suspension system 205 utilized for the purpose of traversing various types of terrain in the work environment, and handle 207 utilized for the purpose of manually pushing robotic device 200.

Figure 3:
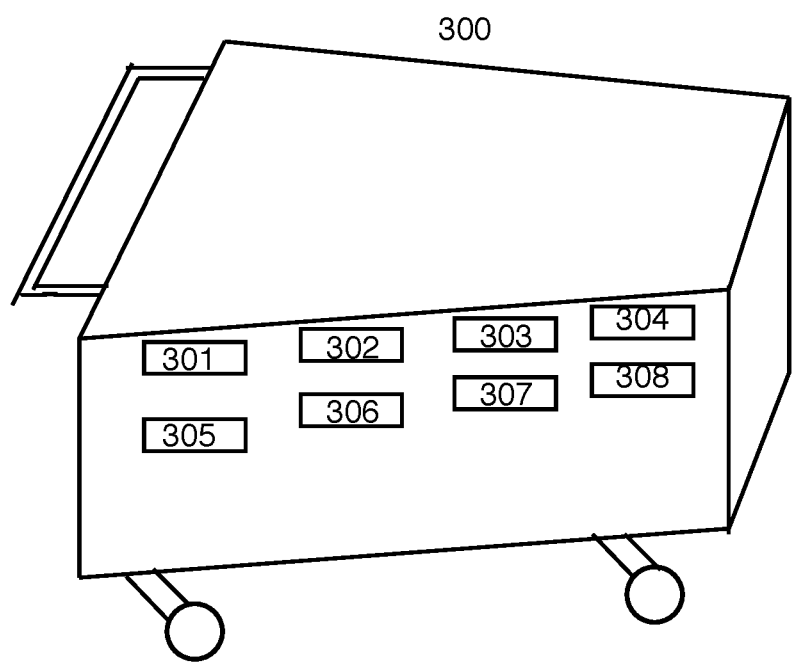
FIG. 3 is a schematic diagram of an example of a robotic device with which the present techniques may be implemented in some embodiments.

FIG. 3 depicts an example of a robotic device 300 with processor 301, memory 302, a first set of sensors 303, second set of sensors 304, network communication 305, movement driver 306, storage container 307, and temperature controlled module 308. The first and second set of sensors 303 and 304 may include depth measuring devices, movement measuring devices, and the like. In some embodiments, the robotic device may include the features of a robotic device described herein. The robotic device may have a variety of shapes, like circular, square, trapezoidal, etc. and may comprise a container, basket, platform, or the like. In some embodiments, program code stored in the memory 302 and executed by processor 301 may effectuate the operations described herein. Some embodiments additionally include user device (not shown) having a touchscreen (not shown) with a software application coupled to the robotic device 300. In some cases, the robotic device charges at a base station (not shown), which in some cases, may include processors and memory by which some of the present functionality is implemented and which may wirelessly communicate with the robotic device 300 in some cases where computations are offloaded in real time.

In some embodiments, robotic devices may be configured solely for the purpose in which the type of item is to be handled. For example, a robotic device may comprise a module for only handling frozen items and that robotic device will only handle the storing and transport of frozen items. As another example, a robotic device may comprise a module for only handling refrigerated items and that robotic device will only handle the storing and transport of items to be refrigerated. As an additional example, a robotic device may comprise a module for cooking or heating items, and the robotic device will only handle the storing, heating, cooking, and transport of items to be heated or cooked. As a further example, a robotic device may comprise a module for storing and transporting items not requiring a cooling or heating element and the robotic device will only store and transport such items. In some embodiments, a robotic device may be of a large or small size. In some embodiments, a robotic device may comprise of the handling of bulk items. In some embodiments, a robotic device may comprise of a container for containing and transporting large volumes of items. In some embodiments, a robotic device may comprise a container for containing and transporting a small volume of items.

In some embodiments, a robotic device may comprise sensors for determining whether an item has a defect such as being damaged, spoiled or the like. For example, the robotic device may include a mechanism such as a sensor arrangement for determining if goods obtained by the robotic device are broken, defective, or have spoiled. For example, the sensors may detect that a set of plates are broken, that clothing is damaged, food items have spoiled, or the like. In embodiments, if an item obtained is deemed to have a defect the robotic device may obtain a replacement item. In embodiments, if an item obtained is deemed to have a defect the robotic device may dispose of the item. In embodiments, if an item obtained is deemed to have a defect the robotic device may alert an individual, a purchaser, control system, a device, another robotic device, or the like that it contains a defective item.

In embodiments, a robotic device may contain a module utilized for the purpose of determining the physical internal contents space usage of items obtained by the robotic device. For example, the robotic device may utilize a module with the purpose of determining how much space is left within the robotic device in which items may be placed for purchase. As an example, if the contents of a robotic device are taking up a predetermined amount of space of the robotic device, one or more processors of the robotic device may determine that the robotic device has reached an internal contents limit capacity. In such a situation, the robotic device may alert the purchaser, a control system, or another robotic device to this information. A robotic device may alert a purchaser via a message or other means of a screen with graphical user interface of the robotic device, by making a sound, by sending a message to an application of a communications device of the purchaser, etc., In embodiments, a robotic device may utilize a module for sending and receiving signals, indicating to a central control system or to another robotic device, that the robotic device has reached capacity and that another robotic device is needed to continue a purchaser's order. In embodiments, if a robotic device has reached an internal contents limit capacity, a purchaser may need to summon a second robotic device for adding additional items to. In embodiments, if a robotic device has reached an internal contents limit capacity, a second robotic device may be summoned by the first robotic device or a control system utilized for controlling or coordinating several robotic devices to continue assisting the purchaser.

In some embodiments, one or more processors of a robotic device may process data in regards to the types of items to be transported by the robotic device, and the data indicative of the item for purchase may determine how the item is stored by the robotic device. For example, the items for purchase to be stored and transported by the robotic device may be distributed based on weight, shape, size, or type of item. For example, heavy items may be placed in locations so as to evenly distribute the weight of the heavy items, such as heavier items being placed at each corner of a container of a robotic device. As another example, fragile items with a tendency of being damaged if mishandled or misplaced, may be placed on top of other items, or in a special compartment so as to avoid becoming damaged during transport. In some embodiments, a robotic device may utilize a module which will monitor the stability of the robotic device and if the module determines that the robotic device is becoming unstable, it may make an alert that items must be repositioned in order to fix the instability issue. In some embodiments, a memory of a robotic device may comprise a prerendered list of items available for purchase, and the data of each item may be indicative of any of: the weight, size, type, shape, expiration date, date of manufacture, packaging date, sell by date, how delicate an item is, if an item must be refrigerated, frozen, heated, cooked, etc., location of an item, and the like. In some embodiments, a robotic device may include a module for the placement, positioning, or repositioning of items to be placed in the container of the robotic device. In some embodiments, a purchaser may need to physically place, position, or reposition items within the container of the robotic device. In some embodiments, if an item has accidentally moved within the container of the robotic device thereby posing a risk to the item or stability of the robotic device, a module of the robotic device or purchaser may need to reposition the item.

In some embodiments, one or more processors may process data indicative of the type and characteristics of an item to be stored and transported by a robotic device and the one or more processors may thereby determine how the item is to be stored and transported. As an example, if the items to be stored and transported are of a fragile nature or include items of a fragile nature, these items may be stored in a separate compartment of the robotic device, or the robotic device may avoid navigating at a particular speed, avoid work surface transitions which could provide an unstable environment, or the like. For example, if a robotic device is storing and transporting items of a fragile nature, the robotic device may avoid navigating over, for example, speed bumps in a parking lot as the elevation change of the speed bump may cause the fragile items to become unstable and break. In some embodiments, one or more processors of a robotic device may alter the speed at which the robotic device travels based on sensory input indicating the type of work surface being operated on. For example, the one or more processors may control a robotic device to navigate at a higher rate of speed in for example a retail establishment as the work surface may be smooth, while controlling the robotic device to navigate at a slower rate of speed on uneven work surfaces such as for example in a parking lot.

In some embodiments, a robotic device may comprise a payment module for the purchase of items with the purpose of completing transactions of an individual. For example, a robotic device may have a physical module present on the robotic device of which payments can be made. Examples include a module for receiving and dispensing cash, a module for receiving card payments such as credit, debit, or gift cards, a card chip-reader, a module for receiving e-payments such as, for example apple pay or the like. In some embodiments, the robotic device may have a module for receiving payments electronically in which payments may be made electronically by a purchaser prior to a purchaser receiving the goods. For example, a purchaser may utilize an application of a communications device such as a smart phone, laptop, tablet or the like, making a payment through the application of which the robotic device receives this payment data and processes the transaction. In some embodiments, one or more processors may process payments made by a purchaser. In some embodiments a control system may process payments made by a purchaser. In some embodiments, a robotic device may store payment information of a purchaser and communicate with another device to process payments. For example, a robotic device may obtain payment information such as card information, electronic payment information such as apple pay or the like, receive cash, and communicate with another device for processing the payment such as a central system for multiple robotic devices which processes payments. In another example, a robotic device may obtain payment information such as card information, electronic payment such as apple pay or the like, receive cash, and interact with a device or individual for processing the transaction such as at a cash register or the like. In embodiments, a robotic device may follow a purchaser around a store and follow the purchaser through a transaction line such as a line at a cash register. In some embodiments, when the robotic device follows the purchaser into a transaction line, the purchaser will make the payment themselves. In some embodiments, when the robotic device follows the purchaser into a transaction line, the robotic device will handle completing payment for the transaction. In some embodiments, the robotic device may enter a transaction line, such as for example, a line at a cash register, and the robotic device will handle processing the payment while the purchaser does not wait in the line. For example, the purchaser may, for example, notify the robotic device that their product selections are complete and they are ready to complete their transaction, after which the purchaser may go to their vehicle while the robotic device handles processing the transaction, after which the robotic device may navigate to and deliver, the goods purchased by the purchaser, to the purchaser's location.

In embodiments, once a robotic device has completed all work functions for a purchaser, the robotic device may navigate to a predetermined location. In some embodiments, a robotic device may navigate to provide services to a second purchaser once tasks have been completed for a first purchaser. In some embodiments, a robotic device may navigate to a shopping cart storage area once tasks have been completed for a first purchaser. In some embodiments, a robotic device may navigate to a robotic device storage area once tasks have been completed for a first purchaser. In some embodiments, a robotic device may navigate to a battery charging area once tasks have been completed for a first purchaser.

In embodiments, the robotic device may compile and catalog all the data from each work session. In embodiments the various data compiled and cataloged may include but is not limited to data pertaining to: mapping, navigation, obstacles encountered or not encountered, floor type, items, products, user preferences, path planning, SLAM data, features of the work environment, payment data, transaction history, and the like. In embodiments, data pertaining to a purchase made by a purchaser may be compiled by one or more processors of a robotic device for future use. For example, data pertaining to the time, date, and location of the purchase, the items purchased, how the purchaser paid, where the items were delivered to such as if the items were delivered to the purchaser's vehicle, and the like data may be compiled and cataloged. Further, demographic information on the part of the purchaser may be compiled for future use such as, for example, age, gender, ethnicity, or the like data may be compiled and cataloged. In embodiments, data pertaining to a purchase, such as how a purchaser paid for items, such as, for example, credit card information, or e-pay data such as apple pay data, may be saved for future use such that the purchaser does not need to re-input this information for future purchases. In embodiments, data pertaining to the location items were delivered to may be compiled and cataloged for future use, such as if the items were delivered to the purchaser's vehicle, or if the purchaser picked up the items from a central location such as in front of an establishment such as a grocery store to pick up the groceries. In embodiments, one or more processors of the robotic device may access the cataloged and compiled data for the purpose of attempting to predict efficient methods for a variety of situations in the future. For example as the one or more processors of the robotic device compile and catalog path planning, SLAM, mapping, obstacle, work surface type, and the like data, the one or more processors of the robotic device may generate a new path plan when a new purchase or work order is initiated, such that all the prior data obtained is utilized with the purpose of creating the most efficient path plan possible based on the specifics of the purchase or work order. For example, if a purchase order includes dry goods, cold goods, and fragile items, the robotic device may access the prior data such that the dry goods are obtained first, the cold goods second, and the fragile items third, taking the shortest route possible, and avoiding obstacles, potential elevation change issues on a work surface such as speed bumps and the like in order to protect the fragile items, while also protecting the cold items by obtaining them after obtaining dry goods. In embodiments, the one or more processors may access prior purchasing data on the part of the purchaser such that the robotic device may predict or recommend an item for purchase to the purchaser based on compiled and cataloged data on the part of the purchaser from prior purchases. For example, if a purchaser routinely selects fruit as a part of items to be purchased, the robotic device may recommend a fruit to be purchased by the purchaser if that fruit has, for example, come into season, or if the fruit is ripe, or if fruit that was previously unavailable has become available. In some embodiments, the one or more processors of a robotic device may predict an item for purchase based on prior purchase history on the part of the purchaser. For example, if a purchaser makes the same purchase at the same time on the same day of the week, one or more processors of the robotic device may predict that the purchaser will do so again on a following week, and obtain the item for purchase and alert the purchaser that the item has already been obtained by the robotic device and simply awaits payment. In some embodiments, a screen with graphical user interface of a robotic device may display advertising materials to a purchaser, the advertising material targeted to the purchaser based on data collected regarding the purchaser. In some embodiments, data may be compiled and cataloged by the one or more processors of the robotic device regarding all purchasers including demographic information such as age, gender, ethnicity or the like, data pertaining to each purchaser's payment method, purchasing history, and the like may be obtained and compiled. In embodiments, for example, these types of data may be utilized for the purpose of making recommendations for purchase of items to a purchaser. For example, the one or more processors of a robotic device may access a particular purchaser's purchasing history in order to recommend an item. As another example, the one or more processors of a robotic device may utilize demographic data on the part of the purchaser, accessing the compiled data of other purchasers in a similar demographic to the purchaser, in order to recommend an item for purchase to the purchaser based on the popularity of that item being purchased by the other purchasers in a similar demographic of the purchaser. As a further example, the one or more processors of a robotic device may utilize all the compiled and cataloged data of all or many purchasers in recommending an item for purchase to the purchaser based on the popularity of items being purchased by other purchasers. For example, if a seasonal item is particularly popular and has been purchased by many individuals, the robotic device may recommend the item to the purchaser. In some embodiments data pertaining to purchasing history may be shared with the establishment such as a store. For example, data may be shared indicative of sales trends such as which products are trending positively and or negatively, how various demographics make purchases, and the like. In some embodiments, data pertaining to a purchaser's repeated purchases at an establishment such as a loyalty index for a purchaser may be cataloged and compiled. In some embodiments, if a purchaser has previously had an item purchased delivered to their location in a parking lot, and the same purchaser has pre-purchased an item and is en route to obtain the item pre-purchased, the one or more processors of a robotic device containing the pre-purchased item may predict the location in which the purchaser will park their vehicle and navigate to that location prior to the purchaser arriving. In embodiments, if a robotic device has navigated to a location for delivery of items, this information may be shared with an application of a communications device of the purchaser to alert the purchaser to the location of the robotic device. In embodiments, if a purchaser elects to receive delivery of items purchased in a location other than that of where the robotic device has navigated to, the robotic device may navigate to the location of the purchaser to deliver the purchased items. In some embodiments, the data compiled may be indicative of trends in an establishment such as, for example, that an establishment has a high volume of customers at particular times, days or the like and this data may be shared with, for example, a purchaser. In some embodiments, purchaser data may be compiled and cataloged by one or more processors of a robotic device such that the data from prior purchases indicates, for example, that a purchaser may require more than one robotic device for the carrying of items, or that a particular size of a robotic device may be necessary such as a robotic device with a larger or smaller container for storing and transporting items for purchase. For example, if a purchaser's history indicates that the purchaser often makes purchases in a large quantity requiring more than one robotic device, two robotic devices may assist the purchaser with storing items. In some embodiments, the one or more processors of the robotic device may catalog and compile data indicative of functionality on the part of the robotic device. For example, data indicative of robotic device storage location, battery life, errors, and the like may be compiled. As an example, data indicative of the number of trips, or length of navigation allowed prior to a battery of a robotic device requiring charging may be compiled and catalogued by one or more processors of a robotic device to predict when a robotic device's battery should be charged. As a further example of this, data indicative of battery life cycle, and data of a purchaser's purchasing trends may be accessed to indicate whether or not a particular robotic device should provide services to a particular purchaser, such as, for example, if a purchaser's purchasing history indicates they are a leisurely buyer who is slow to complete purchases while the robotic device has a low battery life, the one or more processors of a robotic device, or a control system of a robotic device may determine that a different robotic device with a higher battery life should service the purchaser. In embodiments, the multiple robotic devices may communicate with each other or a central system of multiple robotic devices such that the data obtained from each robotic device is shared with all the robotic devices. In some embodiments, if an individual has routinely utilized a robotic device in a reckless or dangerous manner, such as by controlling remotely, the navigation of the robotic device such that the robotic device often impacts with obstacles, individuals, other robotic devices, walls, product displays, the work environment, or the like, the individual may be banned from utilizing the robotic devices.

In some embodiments, multiple robotic devices may collaborate with each other in order to achieve a designated goal. In embodiments, for example, if a second robotic device is needed, a first robotic device may communicate with a second robotic device to provide a purchaser with a second robotic device. As an example, if a first robotic device's container is full, the first robotic device may communicate with a second, third, or the like robotic device if a purchaser wishes to select additional items. As another example, if a first robotic device has been providing services to a purchaser, and the first robotic device has encountered an error, such as requiring a reboot of the system of the first robotic device, the first robotic device may communicate with a second robotic device to provide services to the purchaser. In embodiments, if a robotic device identifies that it is the last available robotic device or that there are few robotic devices left in a robotic device retrieval location for purchasers, such as, for example, a shopping cart or robotic device retrieval location, the robotic device may communicate with other robotic devices to alert other robotic devices that additional robotic devices are needed at the retrieval location. In embodiments, robotic devices may communicate with each other in regards to status updates in the work environment, such as for example, reporting a pothole, a spill, encountering an unexpected obstacle, reporting that a product is out of stock, reporting the status of each payment check-out line such as how long the queue of each check-out line is, reporting that there is a high volume of customers in an establishment, and the like.

Figure 4:
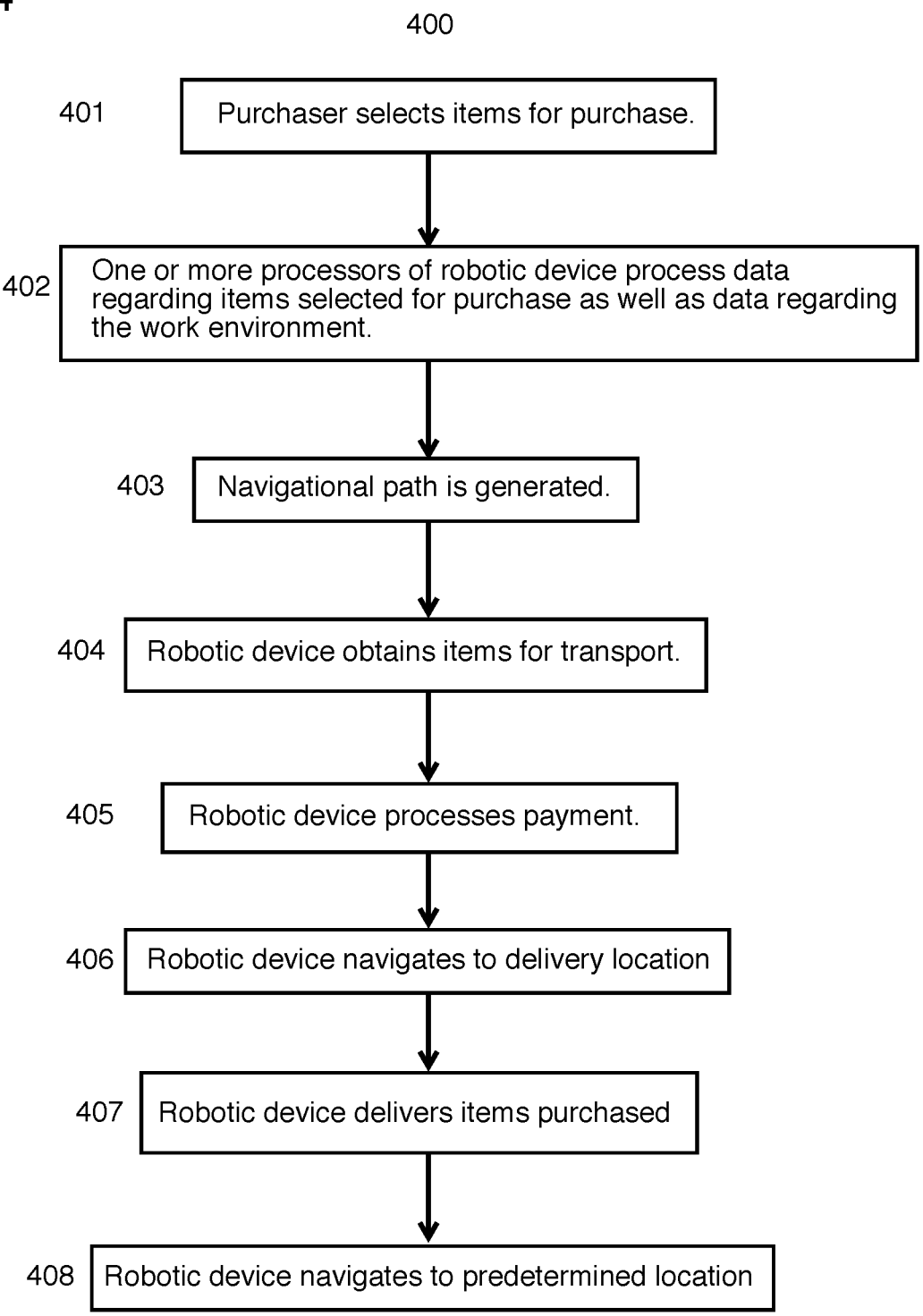
FIG. 4 is a flowchart describing an example of a series of steps which may be undertaken by a robotic device when an order for items purchased is received.

FIG. 4 illustrates a flowchart 400 describing embodiments of a method of a robotic device 401, 402, 403, 404, 405, 406, 407 and 408 corresponding with steps performed in some embodiments.

In some embodiments, the one or more processors of a robotic device may enact a diagnostic check to check the functionality of the various components of the robotic device.

In some embodiments a centralized system of multiple robotic devices may obtain data from the multiple robotic devices and communicate with each robotic device with regards to updates in the work environment, data compiled from other robotic devices, and the like.

In some embodiments, all data are processed on the robotic device. In other embodiments, some data are processed on at least one separate device, such as a docking station of the robotic device or through another device.

The reader should appreciate that the present application describes several independently useful techniques. Rather than separating those techniques into multiple isolated patent applications, the applicant has grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or."

The invention claimed is:

1. A robotic device for delivering items, comprising:
one or more processors;
a chassis;
a set of wheels coupled to the chassis;
a motor for driving the set of wheels;
a suspension system;
a rechargeable battery for providing power to the robotic device;
a control system module for controlling the movement of the robotic device;
a set of sensors; and
a container within which one or more items are carried for delivery to a purchaser;
wherein:
the purchaser comprises a human using the robotic device for delivery services of the one or more items;
the purchaser selects and purchases the one or more items using an application of a mobile device;
the one or more items are separate and independent items from the robotic device and components of the robotic device;
the one or more processors uses data captured by at least one sensor to extract features of an obstacle within an environment of the robotic device;
the one or more processors identifies an obstacle type of the obstacle based on a comparison between the extracted features of the captured data and features of different obstacle types in a database;
the one or more processors determines an action of the robotic device based on the obstacle type of the obstacle;
the robotic device is stored in a designated storage location until required for delivery services; and
the robotic device navigates back to the designated storage location after completing the delivery services.

2. The robotic device of claim 1, wherein the robotic device picks up the one or more items from a pick up location and delivers the one or more items to a delivery location of the purchaser.

3. The robotic device of claim 1, wherein the one or more items comprise groceries.

4. The robotic device of claim 1, wherein the purchaser obtains the one or more items from the container upon arrival of the robotic device to a delivery location.

5. The robotic device of claim 1, wherein:
the robotic device is paired with an application of a mobile device configured to receive at least one input designating a delivery schedule of the one or more items and a delivery location; and
the robotic device delivers the one or more items to the delivery location according to the schedule.

6. The robotic device of claim 1, wherein the robotic device charges at a charging station located within the designated storage location.

7. The robotic device of claim 1, wherein the one or more processors adjusts a planned path of the robotic device upon encountering an obstacle along the planned path of the robotic device such that the robotic device maneuvers around the obstacle.

8. The robotic device of claim 1, wherein:
the container comprises a closed container; and
access to the one or more items within the container is provided upon reaching a delivery location.

9. The robotic device of claim 1, wherein the container comprises a warming module for keeping items warm.

10. The robotic device of claim 1, wherein the container comprises a cooking module for cooking the one or more items.

11. The robotic device of claim 1, wherein the robotic device is one robotic device in a fleet of robotic devices used for delivery services.

12. The robotic device of claim 1, wherein the one or more processors creates a map of an environment of the robotic device based on image data.

13. The robotic device of claim 1, wherein the robotic device delivers items to multiple delivery locations during a single outing.

14. The robotic device of claim 1, wherein an application of a mobile device paired with the robotic device is configured to display a location of the robotic device during delivery of the one or more items to a delivery location.

15. The robotic device of claim 1, wherein the one or more processors detects a location of a purchaser based on detecting a location of a mobile device of the purchaser.

16. The robotic device of claim 1, wherein the one or more processors catalogs an unknown obstacle encountered for future use.

17. The robotic device of claim 1, wherein at least some data processing occurs on a device separate from the robotic device.

* * * * *